United States Patent
Rubens et al.

(10) Patent No.: US 10,478,908 B2
(45) Date of Patent: Nov. 19, 2019

(54) OSCILLATING JIG SAW BLADE

(71) Applicants: Robert Bosch Tool Corporation, Broadview, IL (US); Robert Bosch GmbH, Stuttgart (DE)

(72) Inventors: Jeremy Rubens, Palatine, IL (US); Saad Alam, Franklin Park, IL (US); Jon Guilford, Chicago, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 8 days.

(21) Appl. No.: 15/796,078

(22) Filed: Oct. 27, 2017

(65) Prior Publication Data

US 2018/0117687 A1    May 3, 2018

Related U.S. Application Data

(60) Provisional application No. 62/414,202, filed on Oct. 28, 2016.

(51) Int. Cl.
| | |
|---|---|
| *B23D 51/10* | (2006.01) |
| *B23D 61/00* | (2006.01) |
| *B25F 3/00* | (2006.01) |

(52) U.S. Cl.
CPC .......... *B23D 51/10* (2013.01); *B23D 61/006* (2013.01); *B25F 3/00* (2013.01)

(58) Field of Classification Search
CPC .......... B23D 51/10; B23D 61/006; B25F 3/00
See application file for complete search history.

(56) References Cited

U.S. PATENT DOCUMENTS

| | | | |
|---|---|---|---|
| 2013/0160631 A1* | 6/2013 | Nagy | B23D 61/006 83/848 |
| 2014/0190328 A1* | 7/2014 | Karlen | B23D 61/006 83/853 |
| 2017/0182570 A1* | 6/2017 | Dvorak | B23D 51/00 |

FOREIGN PATENT DOCUMENTS

| | | | |
|---|---|---|---|
| CN | 102423816 A | * | 4/2012 |
| DE | 19613538 C1 | | 7/1997 |
| WO | 2012022269 A1 | | 2/2012 |
| WO | 2015195778 A1 | | 12/2015 |

OTHER PUBLICATIONS

International Search Report corresponding to International Patent Application No. PCT/EP2017/077409 (3 pages).

* cited by examiner

*Primary Examiner* — Stephen Choi
(74) *Attorney, Agent, or Firm* — Maginot Moore & Beck LLP

(57) ABSTRACT

An accessory tool for an oscillating power tool includes a support arm portion having a first lateral edge and a second lateral edge and a blade portion extending from a forward end portion of the support arm portion generally in a lateral direction. The blade portion includes a cutting edge arranged facing in the forward direction and a trailing edge that faces toward the mounting portion. The mounting portion defines a central axis which intersects the oscillating axis when the mounting portion is attached to a tool holder of the oscillating power tool. The first lateral edge of the support arm portion and the trailing edge of the blade portion define an open region which is interposed between the blade portion and the mounting portion. The central axis intersects the open region and both the trailing edge and the cutting edge of the blade portion.

5 Claims, 4 Drawing Sheets

OSCILLATING JIG SAW BLADE

CROSS-REFERENCE TO RELATED APPLICATIONS

This application claims priority to U.S. Provisional Application Ser. No. 62/414,202 entitled "OSCILLATING JIG SAW BLADE" by Rubens et al., Oct. 28, 2016, the disclosure of which is hereby incorporated herein by reference in its entirety.

TECHNICAL FIELD

This invention relates to the field of oscillating power tools, and more particularly to accessory tools for use with oscillating power tools.

BACKGROUND

Oscillating power tools are lightweight, handheld tools configured to oscillate various accessory tools and attachments, such as cutting blades, sanding discs, grinding tools, and many others. The accessory tools enable the oscillating power tool to be used to shape and contour workpieces in a wide variety of ways. Cutting blades, in particular, are used for cutting into a wide range of materials using a straight motion through the workpiece, typically called a "plunge cut." Previously known cutting blades for oscillating power tools While previously known blades for use with oscillating tools are effective in performing plunge cuts and other linear types of cutting operations, such blades are typically limited in their ability to perform curved and non-linear cuts. Consequently, when curved and non-linear cuts are required, users have had to resort to using other types of tools, such as jig saws.

What is needed is an accessory tool for a handheld oscillating power tool that enables curved cutting operations to be performed in a single operation without requiring the use of a separate tool and without having to stop cutting to reorient the tool.

SUMMARY

In accordance with one embodiment of the present disclosure, an accessory tool for an oscillating power tool includes a support arm portion having a first lateral edge and a second lateral edge and a blade portion extending from a forward end portion of the support arm portion generally in a lateral direction. The blade portion includes a cutting edge arranged facing in the forward direction and a trailing edge that faces toward the mounting portion. The mounting portion defines a central axis which intersects the oscillating axis when the mounting portion is attached to a tool holder of the oscillating power tool. The first lateral edge of the support arm portion and the trailing edge of the blade portion define an open region which is interposed between the blade portion and the mounting portion. The central axis intersects the open region and both the trailing edge and the cutting edge of the blade portion.

In accordance with another embodiment, an oscillating power tool includes an oscillating drive member that defines an oscillating axis, a tool holder fixed to the oscillating drive member, and an accessory tool. The accessory tool including a support arm portion having a first lateral edge and a second lateral edge and a blade portion extending from a forward end portion of the support arm portion generally in a lateral direction. The blade portion includes a cutting edge arranged facing in the forward direction and a trailing edge that faces toward the mounting portion. The mounting portion defines a central axis which intersects the oscillating axis when the mounting portion is attached to a tool holder of the oscillating power tool. The first lateral edge of the support arm portion and the trailing edge of the blade portion define an open region which is interposed between the blade portion and the mounting portion. The central axis intersects the open region and both the trailing edge and the cutting edge of the blade portion.

DESCRIPTION

Figure 1:
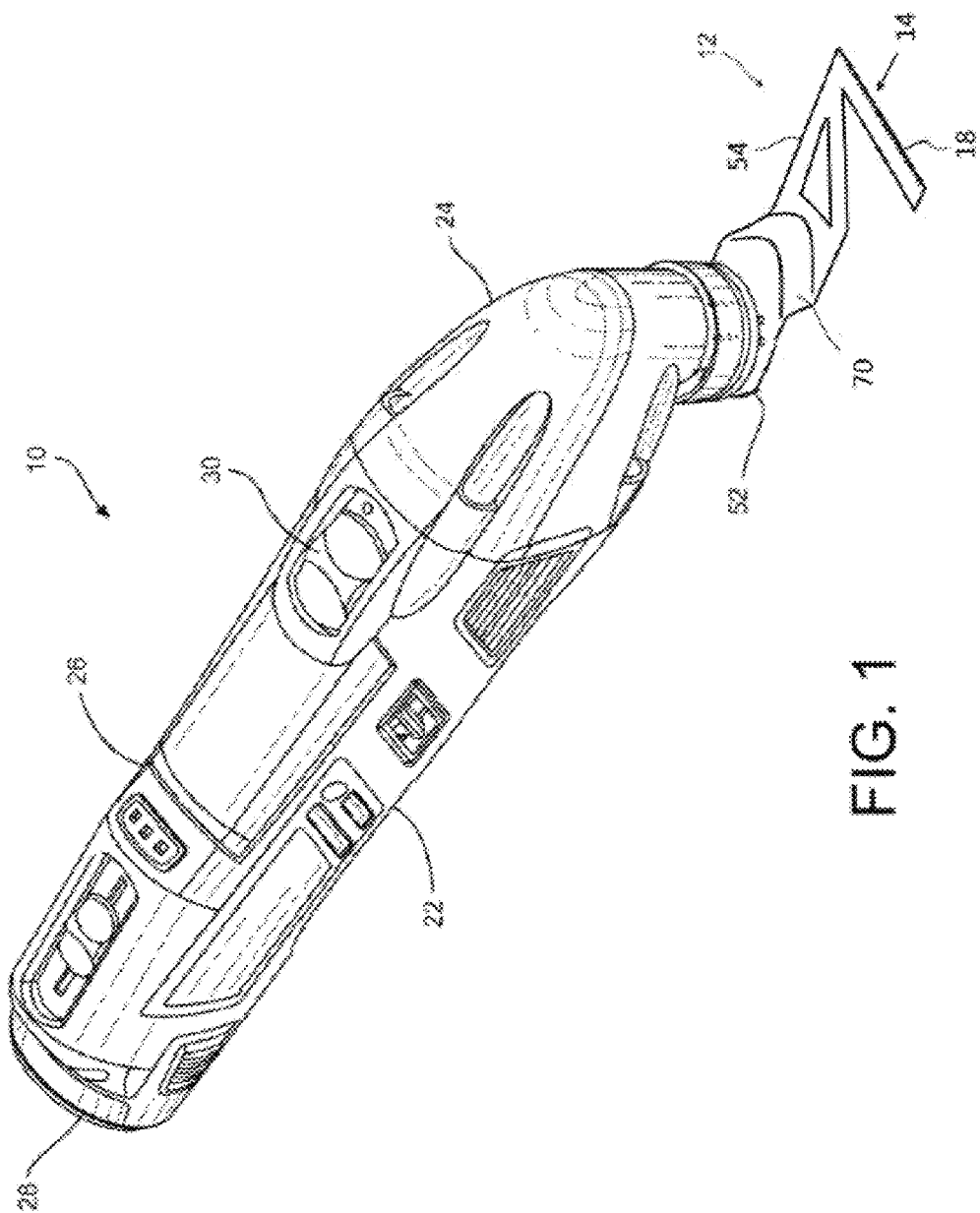
FIG. 1 is a perspective view of an oscillating tool including a jig saw accessory tool according to one embodiment the present disclosure.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one of ordinary skill in the art to which this invention pertains.

Referring to FIG. 1, the present disclosure is directed to a jig saw accessory tool 12 for an oscillating power tool 10. The jig saw accessory tool 12 facilitates using the oscillating power tool 10 in making curved cuts. The jig saw accessory tool 12 includes a mounting portion 52, a support arm portion 54, and a blade portion 14. The mounting portion 52 secures the accessory tool 12 to the oscillating tool 10. The support arm extends from the mounting portion 52 in a first direction. The blade portion 14 extends from the outer end of the support arm portion 54 in a second direction that is transverse to the first direction. The blade portion includes a generally straight leading edge 18 configured as a cutting edge.

The oscillating tool 10 for driving the jig saw accessory includes a generally cylindrically shaped housing 22 constructed of a rigid material such as plastic, metal, or composite materials such as a fiber reinforced polymer. The housing 22 includes a nose portion 24 and a handle portion 26. The handle portion 26 encloses a motor (not shown). In one embodiment, the motor comprises an electric motor configured to receive power from a rechargeable battery 28 connected at the base of the handle portion 26. In other embodiments, electric power for the motor may be received from an AC outlet via a power cord (not shown). As an alternative to electric power, the oscillating power tool 10 may be pneumatically or hydraulically powered. Power to the motor is controlled by a power switch 30 provided on the handle portion 26 of the housing 22.

Figure 2:
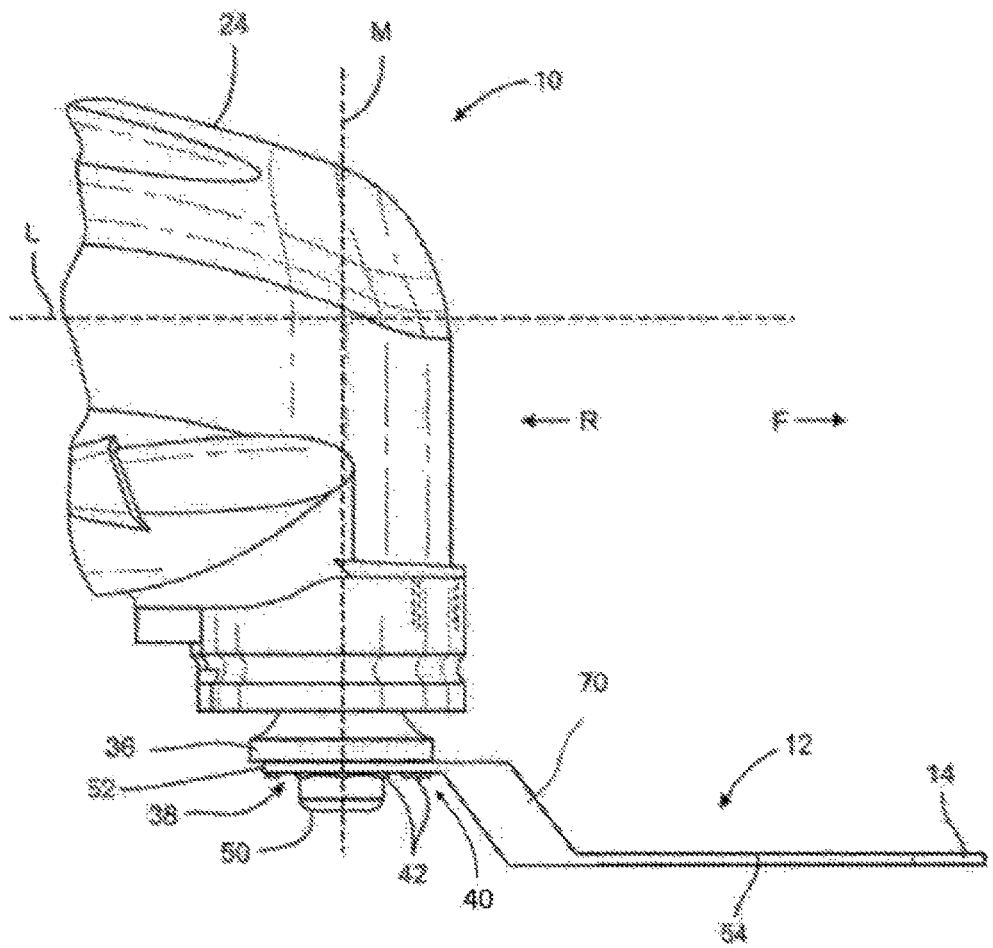
FIG. 2 is a side view of the nose portion of the oscillating tool and the jig saw accessory tool of FIG. 1.

Referring now to FIG. 2, the oscillating tool 10 defines a longitudinal axis L. An oscillating drive member (not shown) extends generally perpendicularly with respect to the longitudinal axis L. The motor is configured to oscillate the drive member about an axis M at high frequencies, e.g., 5,000 to 25,000 oscillations per minute, with a small oscillating angle, typically in a range of between 0.5° and 7°. The drive member supports an accessory tool holder 36 exterior to the housing 22. The tool holder 36 is configured to releasably secure various accessory tools to the drive member, such as the jig saw accessory tool 12. As the tool holder 36 is oscillated by the drive member 32, the accessory tool 12 is driven to oscillate about the axis M of the drive member 32.

To enable a secure connection between the tool holder 36 of the power tool 10 and accessory tools for use with the power tool, the tool holder 36 and associated accessory tools are provided with drive structures 38, 40 that mate to secure the accessory tool to the tool holder 36. In the embodiments described herein, the tool holder 36 includes a tool drive structure 38 that comprises a plurality of protrusions 42 arranged in a circular pattern about a central bore (not shown).

Figure 3:
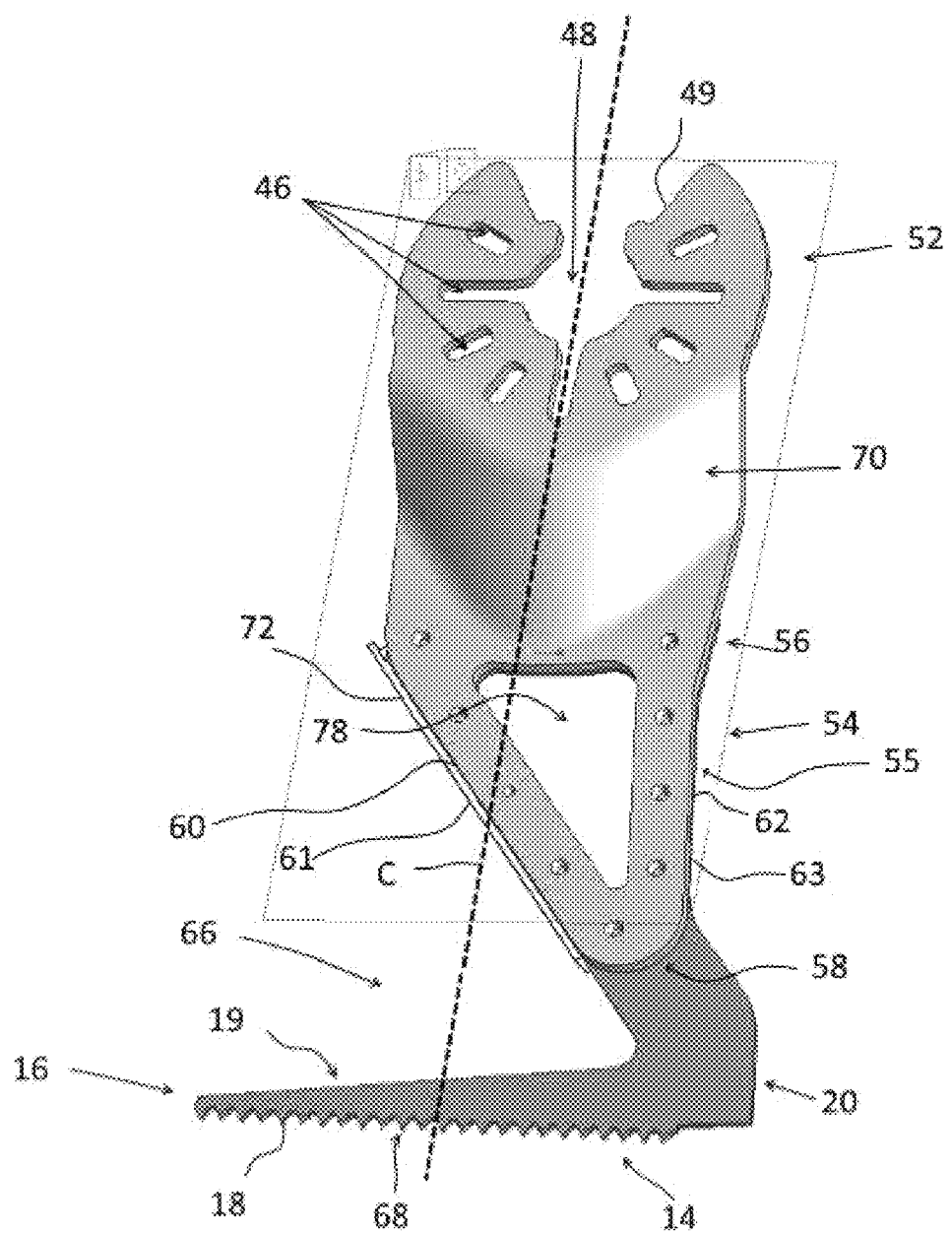
FIG. 3 is a perspective view of the jig saw accessory tool of FIGS. 1 and 2.

Accessory tools for use with the power tool 10, such as the jig saw accessory tool 12, include an accessory drive structure 40 that is configured to mate or interlock with the tool drive structure 38 of the tool holder 36. As depicted in FIG. 3, the accessory drive structure 40 of the accessory tool 12 includes a plurality of openings or recesses 46 and a central opening 48 that are sized, shaped, and positioned complementary to the protrusions 42 and central bore, respectively, of the tool drive structure 38. When the accessory tool 12 is placed onto the tool holder 36, the protruding features 42 of the tool drive structure 38 are received in the corresponding openings and/or recesses 46 defined in the accessory drive structure 40.

A clamping member 50 (FIG. 2), such as a clamping screw, is used to press the accessory drive structure 40 of the accessory tool 12 into interlocking engagement with the tool drive structure 38 thus securing the accessory tool 12 to the tool holder 36. The interlocked drive structures 38, 40 enable the oscillating movement of the tool holder 36 to be imparted to the accessory tool 12.

The jig saw accessory tool 12 comprises a planar body formed of a hard metal material, such as carbon steel. The jig saw accessory tool 12 may be formed by stamping and bending one or more pieces of sheet metal. The body is shaped to form a mounting portion 52, a support arm portion 54, and a cutting blade portion 14. As depicted in FIG. 3, the accessory tool 12 may have a two-piece configuration in which the mounting portion 52 and support arm portion 54 are formed from a first plate and the blade portion 14 is provided as a second plate that is secured to the first plate, e.g., by welding. As can be seen in FIG. 3, the second plate also forms an overlapping portion 55 that overlaps the support arm portion 54 of the first plate. The lateral edges 61, 63 of the overlapping portion 55 are aligned with the respective lateral edges 60, 62 of the support arm portion and extend from the rearmost portion 56 to the distal end portion 58 of the support arm portion 54. Alternatively, the accessory tool 12 may be provided with a one-piece construction in which the mounting portion 52 and blade portion 14 are integrally formed by stamping and bending a single metal plate.

The mounting portion 52 has a generally flat disc-like shape that defines the central opening 48 and smaller openings 46 of the accessory drive structure 40. As depicted in FIG. 3, the mounting portion defines a slot 49 that extends from the central opening through the outer periphery of the mounting portion 52. The slot 49 enables the mounting portion to be installed and removed from the tool holder 36 without having to completely remove the clamping screw 50. The mounting portion 52 defines a central axis C that is centered in the slot 49 and central opening 48. The central axis C of the mounting portion 52 intersects the oscillating axis M when the accessory tool 12 is mounted to the tool holder 36 of the tool 10. The intersection of the axis C and the axis M also defines the pivot point for the accessory tool.

The mounting portion 52 may include a transition region 70 which offsets the support arm portion 54 and the blade portion 14 from the drive member 30 and tool holder 36. This enables the support arm portion 54 and the blade portion 14 to oscillate substantially in a plane that is offset from the plane of the mounting portion 52.

As depicted in FIGS. 1-3, the support arm 54 of the accessory tool extends from the transition region 70 in the forward direction F. The support arm 54 includes a rearmost portion 56 adjacent the mounting portion 52 and a distal end portion 58 that is located distally with respect to the mounting portion 52. The support arm 54 also includes a first lateral support edge 60 and a second lateral support edge 62. The overlapping portion 55 of the second plate, i.e., the blade, includes a first lateral edge 61 and a second lateral edge 63. The first lateral edge 61 is aligned with the first lateral support edge 60 of the support arm 54, and the second lateral edge 63 is aligned with the second lateral support edge 62 of the support arm 54. The overlapping portion 55 extends to the rearmost portion 56 of the support arm 54 so the first lateral edge 61 and the second lateral edge 63 follow and are attached to the first lateral support edge 60 and the second lateral support edge 62, respectively, from the rearmost portion 56 to the distal end portion 60 of the support arm 58. The first and second lateral edges 61, 63 extend beyond the distal end 58 to position the attached end 20 of the blade forward of the distal end portion 58 of the support arm. The blade 14 of the accessory tool 12 extends generally laterally from the attached end 20 of the blade outer end portion 58 in a second direction that is transverse to the forward direction F. The blade 14 includes a forward facing cutting edge 18 and a trailing edge 19. As best seen in FIG. 3, the forward facing edge 18 and the trailing edge 19 may taper toward each other to form a pointed tip portion 16 which enables the tip portion 16 to be used to penetrate certain workpieces such as drywall panels and cardboard.

In the embodiment of FIGS. 1-3, cutting edge 18 of the blade 14 comprises a serrated cutting edge having a plurality of cutting teeth 68. The cutting teeth 68 may be formed in any suitable manner including grinding or laser cutting. The geometry of the cutting teeth can be varied to facilitate the cutting of different kinds of drywall or soft wood materials. The support arm 54 offsets the blade 14 from the mounting portion 52 so the blade, and particularly the cutting edge 18, can be arranged generally parallel to the directions of oscillating movement of the drive member. As can be seen in FIGS. 1 and 3, the support arm portion 34 may have a cutout region 78.

To enable the accessory tool 12 to have a jig saw configuration, the first lateral support edge 60 of the support arm and the first lateral edge of the overlapping portion of the blade are angled toward the second lateral support edge 62 and the attached end 20 of the blade 14. This results in a narrowing of the support arm portion 54 as the support arm portion approaches the blade 14. This also forms a gap or open region 66 behind the blade 14 which enables the blade 14 to have a free end, i.e., tip portion 16, and a long, narrow body, similar to a jig saw blade. As can be seen in FIG. 3, the central axis C intersects the inner lateral edge 60, the open region 66, and both the trailing edge 19 and the forward facing cutting edge 18 of the blade 14. In one embodiment, the blade 14 is oriented such that the leading edge 18 of the blade is perpendicular to the central axis C of the accessory tool. As depicted in FIG. 3, the transition region 70 may have a curved shape which stiffens the connection between the mounting portion 52 and the support arm portion 54. This facilitates directional control of the blade 14 by minimizing bending and flexing of the accessory tool 12 behind the blade 14.

Figure 4:
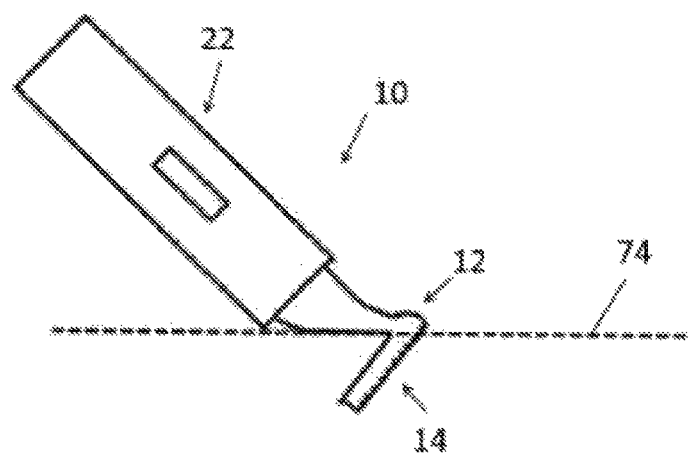
FIG. 4 is an illustration of the oscillating tool and the jig saw accessory tool of FIGS. 1-3 in use.

As can be seen in FIG. 4, the oscillating tool 10 with accessory tool 12 can be used in a manner similar to a jig saw by turning the housing 22 of the oscillating tool 10 sideways so that the blade 14 can be oriented generally perpendicular to the surface of a workpiece 74 to be cut. As the blade 14 is oscillated, the tool 10 can be pushed forwardly to enable the blade to cut through the workpiece 74. As the blade 14 is being pushed through the workpiece 72, the narrowness of the cutting blade 14 makes it easier to change the direction of movement of the blade so that curved and nonlinear cuts can be performed much easier than is possible with previously known accessory tool blades.

Figure 5:
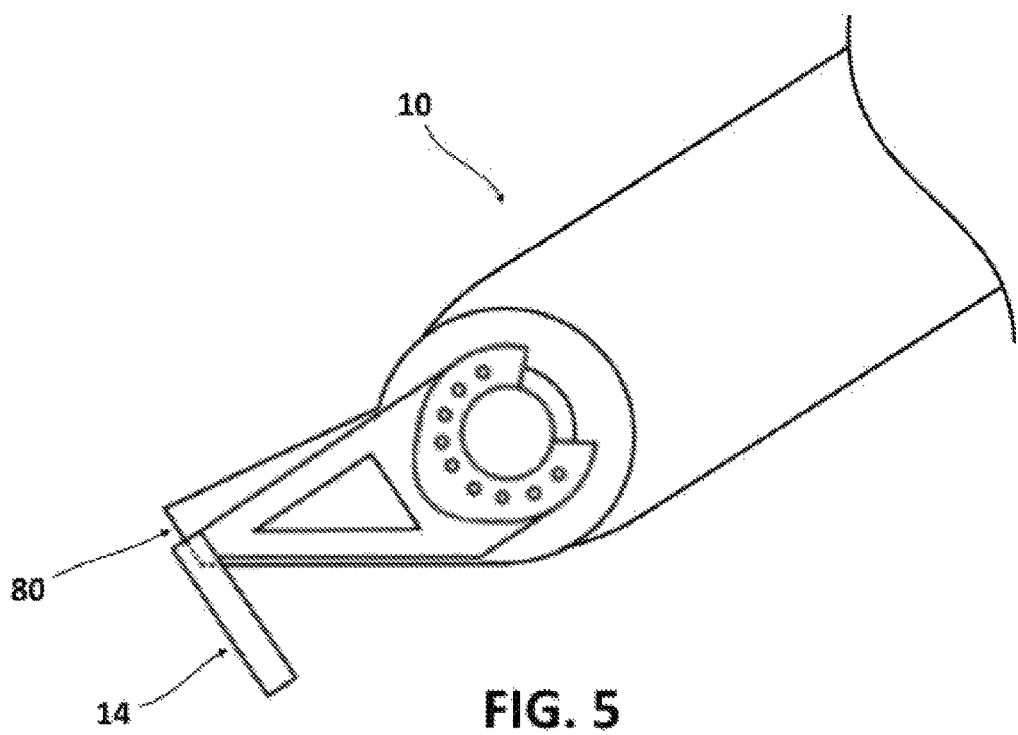
FIG. 5 depicts another embodiment of an oscillating tool for use with a jig saw accessory tool.

To facilitate using the oscillating tool in the manner of a jig saw, one or both of the oscillating tool 10 and the accessory tool 12 may be provided with a guide for guiding the oscillating tool 10 across the surface of the workpiece. As depicted in FIG. 3, the first lateral support edge portion 60 of the support arm 54 may be provided with a guide edge portion 72. The guide edge portion 72 comprises a lip, or similar type of structure, that extends in a direction perpendicular to the plane of the support portion 54. The guide edge portion 72 provides a wider surface which can be positioned in contact with the surface of a workpiece and slid across the surface of the workpiece as the blade 14 is being pushed. and for use as the guide surface of the accessory tool 12. As an alternative to providing a guide surface on the accessory tool 12, the oscillating tool may be provided with a guide that can be positioned in contact with the surface of a workpiece and slide across the surface as the blade 14 is being pushed. An example of such a guide 80 is depicted in FIG. 5.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. An accessory tool for an oscillating power tool, the oscillating power tool defining an oscillating axis, the accessory tool comprising:
a first metal plate forming:
   a mounting portion configured to mate with an oscillating drive member of a power tool; and
   a support arm portion including a rearmost portion, a distal end portion, a first lateral support edge and a second lateral support edge, the rearmost portion being adjacent the mounting portion, the first lateral support edge and the second lateral support edge extending in a forward direction from the rearmost portion to the distal end portion, the first lateral support edge being angled toward the second lateral support edge such that the support arm portion narrows as it approaches the distal end portion; and
a second metal plate forming:
   an overlapping portion attached to the support arm portion, the overlapping portion including a first lateral edge, a second lateral edge, and a forward end portion, the first lateral edge being aligned with the first lateral support edge, the second lateral edge being aligned with the second lateral support edge, the first lateral edge and the second lateral edge following the first lateral support edge and the second lateral support edge, respectively, from the rearmost portion of the support arm portion and beyond the distal end portion to position the forward end portion forward of the distal end portion of the support arm portion; and
   a blade portion extending laterally from the forward end portion of the overlapping portion, the blade portion including a cutting edge arranged facing in the forward direction and a trailing edge that faces toward the mounting portion,
wherein the mounting portion defines a central axis which intersects the oscillating axis when the mounting portion is attached to a tool holder of the oscillating power tool,
wherein the angled first lateral support edge of the support arm portion and the trailing edge of the blade portion define an open region which is interposed between the blade portion and the mounting portion, and
wherein the central axis intersects the open region, the first lateral support edge of the support arm portion and both the trailing edge and the cutting edge of the blade portion.

2. The accessory tool of claim 1, wherein the cutting edge is arranged perpendicular to the central axis.

3. The accessory tool of claim 1, wherein the mounting portion includes a transition region from which the support arm portion extends, the transition region offsetting the support arm portion from the mounting portion.

4. The accessory tool of claim 1, wherein the trailing edge and the cutting edge meet to define a tip portion at an opposite end of the blade portion from the attached portion, and
wherein the trailing edge and the cutting edge are tapered toward each other such that the blade portion narrows as it approaches the tip portion.

5. The accessory tool of claim 1, further comprising:
a lip portion extending along the first lateral support edge configured to serve as a guide surface for the accessory tool during cutting operations.

* * * * *